(No Model.) 5 Sheets—Sheet 1.

J. H. WHITE.
MACHINE FOR MAKING STEREOTYPE MATRICES.

No. 374,438. Patented Dec. 6, 1887.

WITNESSES
Sidney P. Hollingsworth
W. H. Shipley

INVENTOR
J. H. White
By P. T. Dodge
Attorney

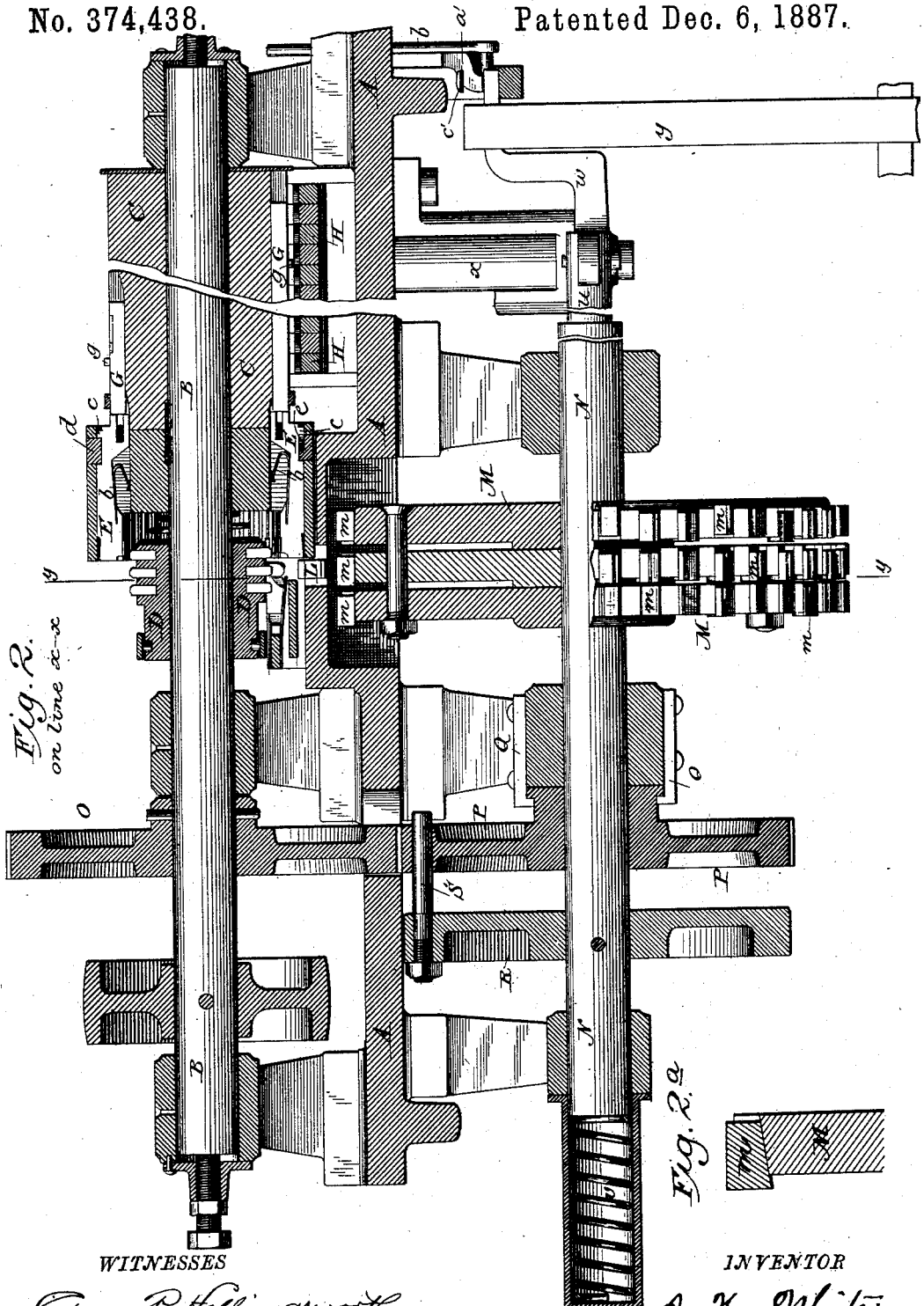

(No Model.) 5 Sheets—Sheet 3.

J. H. WHITE.
MACHINE FOR MAKING STEREOTYPE MATRICES.

No. 374,438. Patented Dec. 6, 1887.

on line y-y

WITNESSES

INVENTOR (No Model.) 5 Sheets—Sheet 4.
J. H. WHITE.
MACHINE FOR MAKING STEREOTYPE MATRICES.
No. 374,438. Patented Dec. 6, 1887.
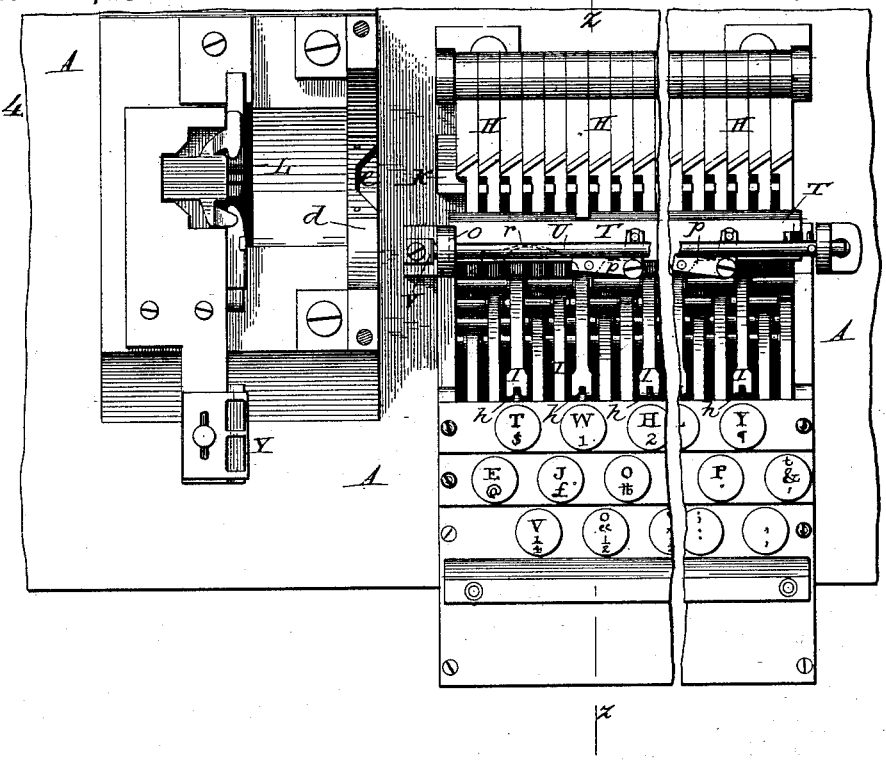
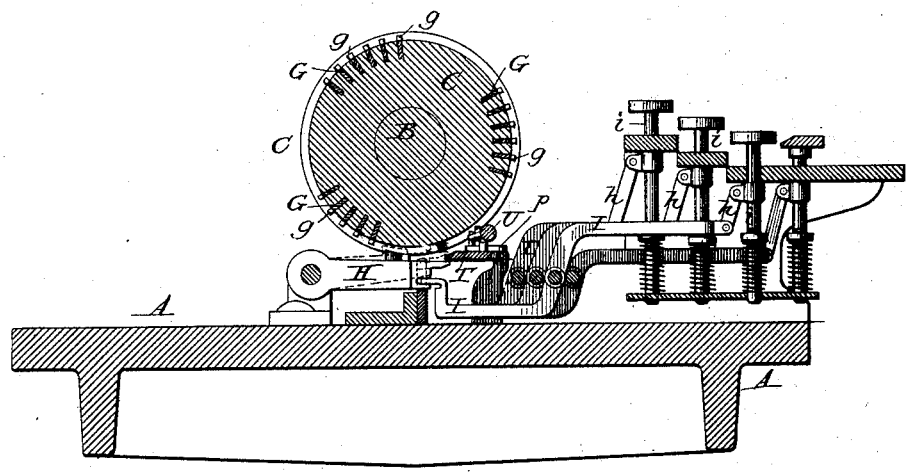
WITNESSES
W. H. Shipley.
Wm. R. Kennedy
INVENTOR
J. H. White
By P. T. Dodge
Attorney (No Model.) 5 Sheets—Sheet 5.
J. H. WHITE.
MACHINE FOR MAKING STEREOTYPE MATRICES.
No. 374,438. Patented Dec. 6, 1887.
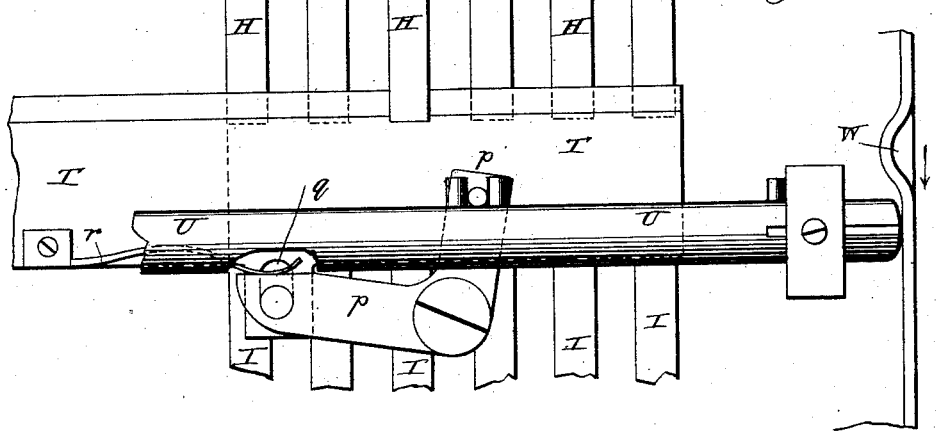
Fig. 6
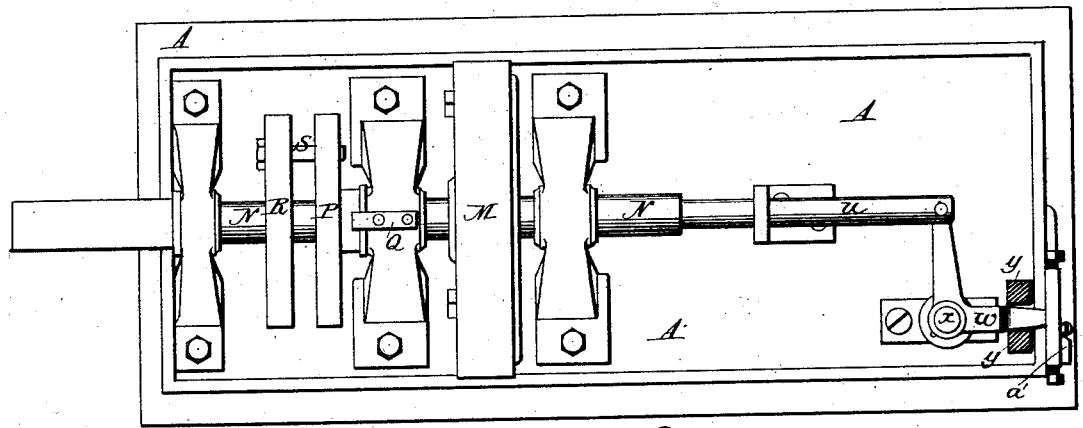
Fig. 7.
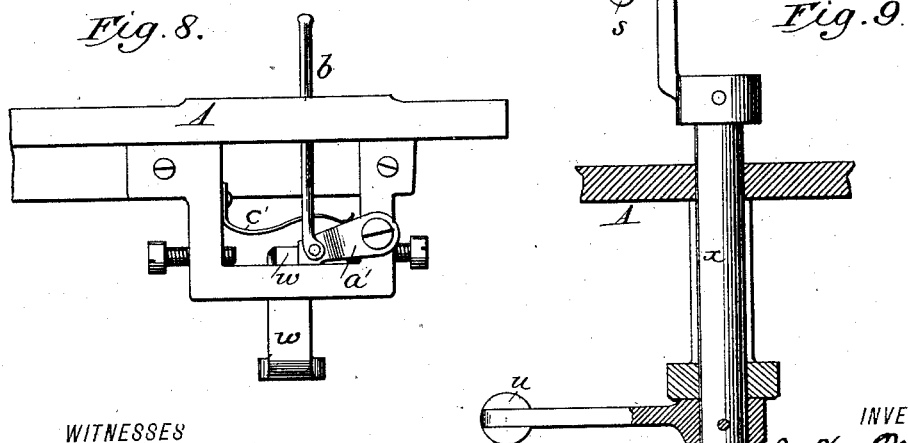
Fig. 8.
Fig. 9.
WITNESSES
Sidney P. Hollingsworth
W. H. Shipley
INVENTOR
J. H. White
By P. T. Dodge Atty.

UNITED STATES PATENT OFFICE.

JOHN H. WHITE, OF WASHINGTON, DISTRICT OF COLUMBIA, ASSIGNOR TO THE NATIONAL TYPOGRAPHIC COMPANY.

MACHINE FOR MAKING STEREOTYPE-MATRICES.

SPECIFICATION forming part of Letters Patent No. 374,438, dated December 6, 1887.

Application filed March 17, 1886. Serial No. 195,563. (No model.)

*To all whom it may concern:*

Be it known that I, JOHN H. WHITE, of Washington, in the District of Columbia, have invented certain Improvements in Machines for Making Stereotype-Matrices, of which the following is a specification.

This invention relates to those matrix-making machines in which the characters are impressed or indented successively into the papier-maché or equivalent material through the medium of mechanism driven by a suitable motor and controlled by finger-keys, and more particularly to machines of the type represented in Letters Patent of the United States granted to Ottmar Mergenthaler on the 26th day of August, 1884, No. 304,272, in which a revolving wheel having fixed peripheral type is combined with a concentric cylinder having slides which may be projected opposite the respective type, and with a revolving pressure-wheel having cam-surfaces to force the slides momentarily toward the type to effect the impression.

The principal objects of the invention are to provide for the radial adjustment of the cam-surfaces by which the respective characters are forced into the material, to the end that an absolutely-uniform depth of impression may be secured; to facilitate the removal and replacement of the pressure slides or hammers; to enable the attendant to conveniently read the matrix as it is produced; to provide for spacing the characters in such manner as to facilitate the subdivision of the matrix-strip into short lengths or line-strips; to provide for printing or indenting at will superior characters—that is to say, characters raised above the lines; to facilitate the examination of the operative parts, and to secure various other objects, hereinafter enumerated in detail.

Figure 1:
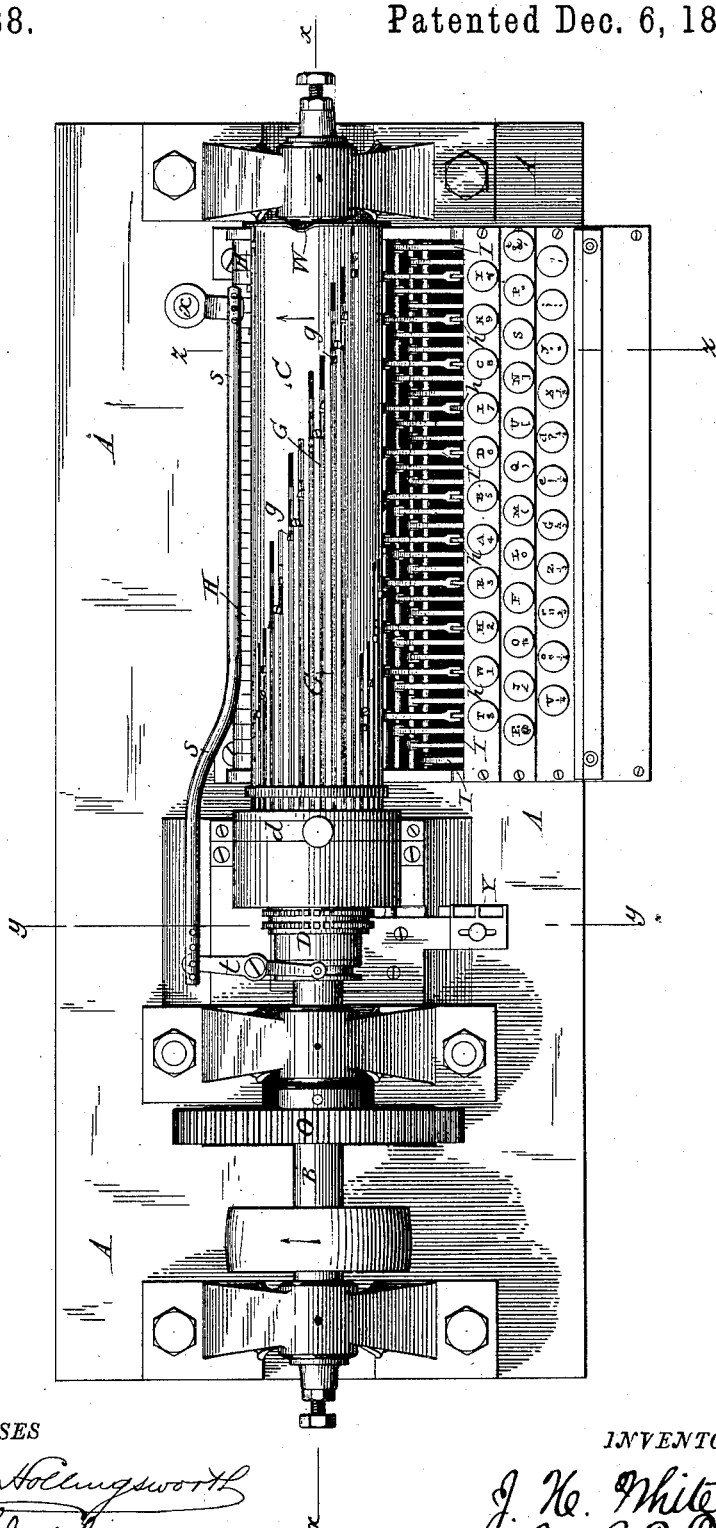
Figure 5:
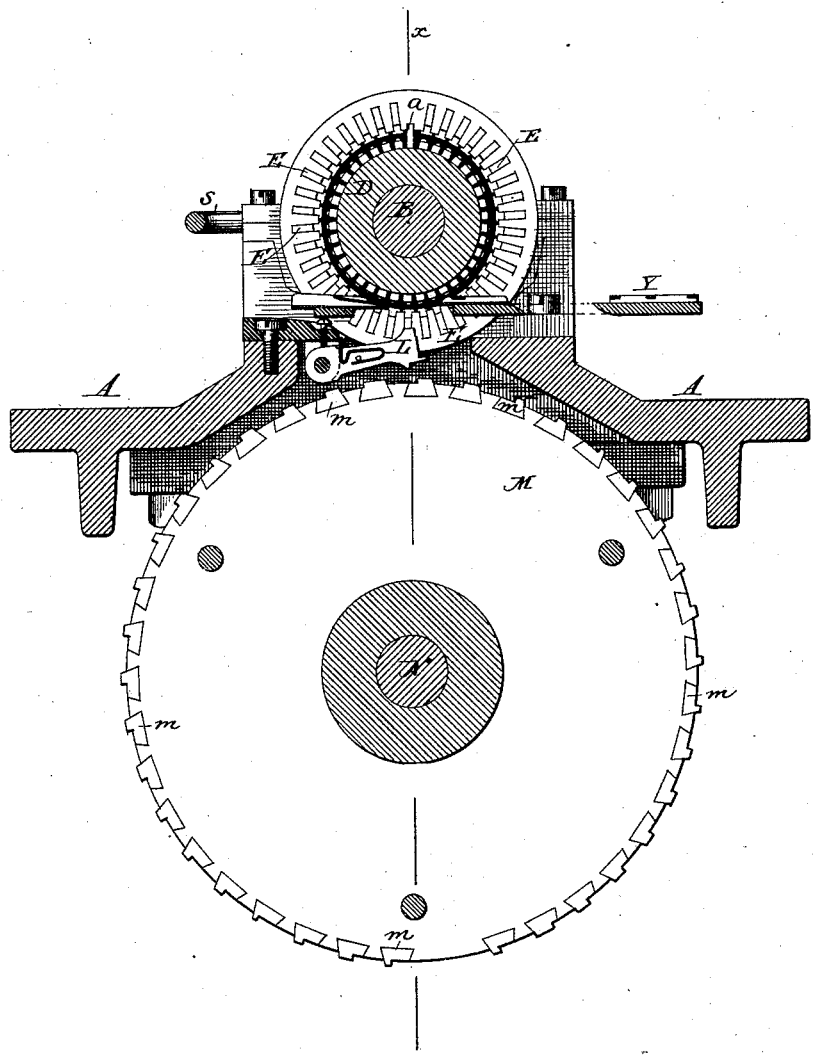

Referring to the accompanying drawings, Figure 1 represents a top plan view of the machine; Fig. 2, a longitudinal central vertical section of the same, a portion being broken away in order to admit of the figure being made on an enlarged scale. Fig. 3 is a vertical cross-section on the line $y\ y$. Fig. 4 is a top plan view of a portion of the bed-plate, key-board, and attendant parts, with the overlying cylinder and wheels removed in order to expose the parts thereunder. Fig. 5 is a vertical cross-section on the line $z\ z$ of Fig. 1, showing more particularly the arrangement of the finger-keys and connections. Fig. 6 is a plan view in the nature of a diagram, showing a part of the mechanism for locking the finger-keys. Fig. 7 is a bottom plan view showing the mechanism for adjusting the type-wheel laterally to bring the different series of type into action. Fig. 8 is an end elevation of the same. Fig. 9 is a vertical section showing the vertical rock-shaft of the two preceding figures and its connections. Fig. $2^a$ is a transverse section through the edge of one of the cam-wheels, the inclination of the inclined blocks being exagerated for the purposes of illustration.

A represents a frame or bed-plate provided with standards supporting a horizontal main shaft, B, provided with a driving-pulley serving to communicate motion to all the operative parts of the machine. This shaft carries a long cylinder, C, fixed thereon, and a type-wheel, D, having a radial arm, $a$, seated in a longitudinal slot in the cylinder, or otherwise connected with the cylinder, so that while compelled to rotate therewith it may slide independently in an axial direction. The wheel is encircled by two or more rows of fixed radial type, which may be formed solidly thereon or secured therein in any appropriate manner. The end of the cylinder adjacent to the type-wheel is provided with a central cavity, or, in other words, made of a bell shape, to admit of the type-wheel sliding therein, in order that one or another of its rows of type may be brought into an operative position.

In the enlarged end of the cylinder I mount a series of longitudinally-reciprocating and radially-vibrating hammers or pressure-arms, E. These hammers equal in number the type in each row, and they are so arranged that when any one of the series is moved forward in an endwise direction its inner face will be brought opposite the face of a corresponding type on the wheel. The hammers are seated in slots in the end of the cylinder and each provided on the inside with a spring, $b$, by which it is urged outward away from the type, in order that the paper or matrix-strip may be inserted between them. Each hammer has at its rear end a projection, c, to operate in connection with a stationary cam-ring, d, by which the cylinder is encircled. This ring is recessed at the under side, as shown at e, Fig. 4, so that at the instant each hammer is carried to the under side of the cylinder by the rotation of the latter the stud on the hammer is brought opposite the opening e, thus releasing the hammer that it may be projected endwise to the printing position. As the motion of the cylinder continues, the stud of the hammer is carried against the inclined wall of the recess and the hammer restored endwise to its original position.

The projection of the hammers is effected by slides G, mounted longitudinally in slots in the circumference of the cylinder C, each slide bearing against the inner end of a corresponding hammer. The slides are each provided at the rear end with a stud or projection, g, the series of studs being arranged spirally about the cylinder in position to be acted upon by oblique ribs on a series of pivoted rising-and-falling arms, H, which lie beneath the cylinder, as shown in Figs. 4 and 5. These arms stand normally in a depressed position below the path of the studs. When, however, any one of the arms is elevated, its rib will encounter the stud of the corresponding slide as the latter is advanced by the rotation of the cylinder. The rib, acting on the stud, will cause the slide to move endwise and push the corresponding hammer outward to the position for operation below that type which is for the instant directly beneath the center of the type-wheel.

The elevation of the arms H is effected by means of corresponding levers, I, the forward ends of which are connected by links h to vertical rods i, provided on their upper ends with finger-pieces and lifted by means of spiral springs j encircling them. The finger-keys are arranged in several rows or banks. The levers I are all of one length, those which connect with one bank of keys being mounted on a common pivot distinct from the pivots which sustain the levers connected to the other banks, as plainly represented in Figs. 4 and 5. By this construction I substantially equalize the force of the touch required to operate the different keys, which is found in practice highly advantageous, as the operator is enabled to manipulate the keys with greater certainty and more uniformity than in machines in which the keys offer different degrees of resistance.

In order to prevent the levers H from playing laterally as the slides are forced against them, I arrange their forward ends to play in vertical slots in a guide-plate, K, fixed firmly to the main frame. The springs by which the finger-keys are lifted act against collars secured or threaded thereon, so that they may be adjusted vertically to vary the tension of the individual springs as occasion may require.

It occasionally becomes necessary to remove from the machine, for one purpose or another, one or more of the hammers E. In order that this may be conveniently done without dismantling the machine, the slots in which they move are extended to the end of the cylinder, so that when released the hammer may be withdrawn in an endwise direction. To prevent the accidental escape of the hammers, but permit their withdrawal one at a time when demanded, the upper portion of the cam ring or band d is made removable, being secured in place by screws or otherwise.

Experience has shown that the speed of operation may be greatly increased by providing means for locking the arms H forward after being actuated by the finger-keys and until they have acted upon the slides, so that the operator, after depressing one or more keys, may remove his hands and operate others without waiting for the printing of the characters represented by the keys first depressed. To this end I provide a bar, T, lying horizontally in front of the arms H, its ends seated in slots in supporting-standards o, as shown in Fig. 4, so that it may be engaged above or below the respective arms, according as the latter are in their elevated or depressed positions. Two elbow-levers, p, mounted on fixed pivots, overlie the ends of the bar and are each provided with a stud entering a transverse slot, q.

For the purpose of drawing the bar backward out of engagement with the arms springs r, secured to the plate T, bear against the levers p and force the plate forward until the studs of the levers encounter the rear ends of the slots. The levers stand normally in such position that when the blade is thus thrown forward it will engage the arms. The two levers are, however, connected by pins with a bar, U, reciprocating horizontally in suitable guides and arranged to be acted upon at one end by a cam or projection, W, on one end of the cylinder, as shown in Figs. 1 and 6. This cam, urging the rod endwise, causes the levers to momentarily move the plate T backward. During this brief period the arms which were previously elevated and which have performed their functions may be dropped to their original inactive positions, and at the same time the arms which are subjected to the action of the finger-keys may rise to an operative position. As the action of the cam W ceases, a spring, V, acting on the opposite end of the bar U, returns the same to its original position, moving the slide-plate T forward, so as to lock the arms H in their new position. The springs r form a yielding connection between the plate and the levers, so as to avoid breakage of the parts in the event of an arm H presenting its end directly in front of the plate during the time that the latter is being urged forward.

I am aware that a reciprocating blade to lock a series of finger-keys in a machine of the present type is not new; but the peculiar operating devices herein shown are found far superior to those heretofore in use, by reason of the smooth and noiseless manner in which they operate, and because the elbow-levers may be constructed with one end longer than the other, so as to enable the cam W, having a slight lift or rise, and a consequently easy action, to impart a greater movement to the plate.

For the purpose of forcing each slide at the instant that it is projected inward centrally toward the corresponding type, I provide a pressure-dog, L, pivoted to the bed-plate so as to swing upward beneath the slide, and to actuate this dog I mount thereunder the rotary wheel M, provided at the periphery with a series of cam surfaces or elevations, $m$. This wheel is mounted on a horizontal shaft, N, seated in bearings on the under side of the bed-plate, and is caused to revolve in equal times with the type-wheel, so that each of the cam-surfaces will operate always in connection with the same slide and type. The cam-surfaces are made of different widths circumferentially, corresponding with the width of the letters which they represent, so as to hold the dog in action for a corresponding length of time. This insures the advancement of the paper or matrix-strip, which is confined between the hammer and type, distances corresponding with the width of the respective characters in substantially the same manner as in the original Mergenthaler machine.

The cam-wheel is provided with as many circumferential rows or series of cam-surfaces as there are rows of type on the type-wheel, and the cam-wheel is arranged to shift laterally in unison with the type-wheel, as hereinafter more fully described, to bring the proper lines of cams into position. Thus it is that every type is caused to operate in connection with its corresponding cam-surface, so that the feeding of the paper is accurately regulated according to the width of each character indented.

Instead of connecting the shafts B and N by heavy shifting-gears, as in the Mergenthaler patent, I provide the upper shaft, B, with the gear-wheel O, engaging a narrow wheel, P, which is mounted loosely on the lower shaft, N, and fixed against lateral motion by a side flange or collar engaged by plates or clamps Q, fixed to the frame, as shown in Fig. 2. Motion is communicated through the gear P to the shaft N by means of an arm or disk, R, secured to the shaft and provided with a lateral pin, S, which slides through a hole in the driving-gear P, or by a similar sliding connection. This construction permits the shaft N to move endwise independently of the gear P, in order to effect the lateral adjustment of the cam-wheel M, as demanded by the various adjustments of the type-wheel.

The present construction is advantageous, because it permits the employment of lighter gears than in the original machine, and for other reasons unnecessary to detail.

Practical experience has shown that it is extremely difficult to construct a cam-wheel the many surfaces of which shall be and remain of the exact height required. To overcome this difficulty I construct a wheel with the cam-surfaces separate from and adjustable radially upon the body of the wheel. The surfaces may be variously applied and secured to permit this adjustment; but I recommend as a simple construction, and one which has in practice given excellent results, that shown in Figs. 2 and 3, in which each of the cams $m$ has its base portion made of dovetailed form and driven laterally into a corresponding slot in the body of the wheel. The bottom faces of the cam-plates and their seat in the periphery of the wheel are in planes inclined slightly to the axis of the wheel, so that as the cams are driven laterally they will at the same time move radially to or from the center of the wheel. The operator is thus enabled, by tapping the cams slightly with a hammer, to adjust each cam radially independently of its fellows, so as to secure the exact depth of impression demanded for each type.

The body of the wheel may be made in one solid plate; but I prefer to construct the same of two or more plates, each carrying a line of cams, the several plates secured together by bolts or other fastenings.

In order to effect the simultaneous lateral adjustment of the type-wheel and cam-wheel to bring one or another of the rows of type and the corresponding cams in line with the pressure-dog L in position for use, a vertical shaft, $x$, is extended through bearings attached to the bed-plate, provided at its upper and lower ends with horizontal arms. The upper arm is connected by a rod, $s$, to one end of a forked lever, $t$, which is pivoted to the main frame and arranged to engage at the opposite end in a peripheral groove in the type-wheel. The arm at the lower end of the vertical shaft is pivoted to a horizontal rod, $u$, which slides through a horizontal guide and bears against the end of the cam-wheel shaft N. A spring, $v$, bears against the shaft N and tends constantly to urge the cam-wheel M toward the right, and other intermediate devices, hereinafter described, to urge the type-wheel to the left. The vertical shaft has at the lower end a second horizontal arm, $w$, which enters the upper forked end of a lever, $y$, pivoted to the frame and adapted to be operated by hand or by foot, as preferred. By moving the lever $y$ the type-wheel and cam-wheel may be adjusted so as to bring any desired line of type to the printing position and at the same time bring the appropriate cam-wheel opposite thereto.

Under ordinary circumstances two lines of type will supply the characters most commonly brought into use, the third line being employed for those characters which are seldom demanded.

To facilitate the adjustment of the type-wheel and prevent the third row of type from being unwittingly brought into action, I provide a stop device by which the adjustment of the type-wheel is ordinarily limited so that only one or the other of the two lines will be brought into operative position. This stop device may be variously constructed, but as shown in Figs. 7 and 8 it consists of a latch, a', pivoted to the frame and arranged to drop behind the arm w of the vertical shaft so as to limit its play. A rod, b', extending upward from this latch enables the operator to lift the same out of action, and thus permit the full play of the arm w when the third row of type is brought into action. The dog may fall by gravity or be depressed by a spring, c', as shown in Fig. 8. When the third row of type is in action, the arm w stands beneath the dog; but as the parts are moved to bring either of the other rows into use the arm w rides from under the dog, which drops automatically behind the same, thus limiting the adjustment of the parts, as before.

I believe myself to be the first to combine with a laterally-movable type-wheel adjustable stop devices by which the limit of adjustment of the wheel may be restricted or enlarged at will.

Referring again to the cylinder and the hammers E, it is to be noted that the end of the cylinder in which the hammers are mounted is enlarged and that it partly encircles or surrounds the series of hammers which are seated in grooves in the inner surface. In the original machine the hammers or pressure-slides were mounted in slots extending outward through the periphery of the cylinder, which was greatly weakened by the presence of the numerous slots therein. In practice it was found that the parts were consequently liable to spring out of position, causing the hammers to bind and otherwise affect the action of the parts. By my improved construction, the essence of which consists in having the slides encircled by the unbroken or continuous end of the cylinder, I am enabled to avoid the difficulties above mentioned. The cylinder may be made in a single piece, or it may be built up, as shown in the drawings, of two or more parts firmly united.

The original Mergenthaler machine delivered the matrix-strip at the right of the operator, and in such position that it was practically impossible to read the matter as it was delivered. I construct my machine in such manner that the attendant is enabled to read the characters. To this end I arrange the type-wheel at the left instead of at the right of the machine, in such position therein that the strip delivered toward the operator at his left will present its characters in an upright position and in the order in which they are to be read.

In order to facilitate the spacing of the matter in the strip, so as to permit the convenient separation or division of the strip at the proper points, I attach to the bed an adjustable gage or indicator, Y, through or over which the strip is delivered. This indicator is at a distance from the impression-point equal or substantially equal to the length of the sections into which the matrix-strip is to be divided, or, in other words, equal to the width of the page or column to be printed. The attendant, noting the arrival of a point for division at the gage, knows that he has printed sufficient matter for another section or line, and accordingly operates the space-bar so as to leave in the matrix-strip a blank space, in order that the strip may be severed without injury to the characters on either side of said space.

It will be understood that the spacing is accomplished, as in the original Mergenthaler machine, by a hammer operating in connection with a blank type or feed-surface on the type-wheel to grasp and advance the strip in the same manner that it is advanced by the type and their co-operating hammers.

I believe myself to be the first to employ in a machine for indenting or printing with a series of type an operating-wheel having independently-adjustable surfaces to effect the action of the respective type, and it is manifest that this feature may be applied in various forms and to various machines at present known in the art. It is applicable alike to those wheels which have the type movable to effect the impression and to those which have the type fixed on a wheel, as herein shown, to operate in connection with movable impression devices, and is applicable not only to those machines in which the impression-wheel has the type-controlling surfaces upon its periphery, but to those in which the type-controlling surfaces are on the side face of the wheel.

While I prefer to employ between the type-wheel and the cam-wheel a pressure mechanism consisting of the dog L and the slides, as described, it is to be understood that my invention is not restricted to the use of these particular devices for communicating the pressure of the cam-surfaces to the paper, the improvement being adapted for use in connection with any suitable devices acted upon by the cam-wheel to apply pressure to the paper, several such devices being already known in the art.

Having thus described my invention, what I claim is—

1. In a rotary indenting or printing machine, a wheel having fixed type, in combination with a pressure-wheel having independent radially-adjustable surfaces, and intermediate means, substantially as described, for communicating the pressure of the cams to the paper upon the type.

2. The wheel having the series of pressure blocks or cams seated movably in inclined seats, substantially as described, whereby their independent radial adjustment is permitted.

3. The rotary wheel having fixed type and the cylinder provided with the longitudinally and radially movable hammers, in combination with the dog L, the wheel M, having the radially and independently movable cam-surfaces, and the gear to cause the synchronous rotation of the type-wheel and pressure-wheel, whereby the depth of impression of each type my be controlled independently.

4. The rotary cylinder and the longitudinal slides therein, in combination with the pivoted slide-actuating arms H, and the finger-levers I, pivoted independently of the actuating-arms and acting thereon, substantially as described.

5. The cylinder, its slides, and the slide-controlling arms H, in combination with the levers I, the finger-key rods sliding vertically in guides, and their lifting-springs.

6. The cylinder, its slides, and the slide-controlling arms, in combination with the spring-pressed locking bar or plate T, the elbow-levers to actuate the same, the rod connecting the levers, and the cam to actuate the rods.

7. The arms H and the locking-bar T, in combination with the levers having a slotted connection with the bar, the springs connecting the levers and bar and urging the latter forward, and the rod and cam to actuate the levers.

8. The longitudinally and radially movable hammers or slides E, in combination with their supporting-cylinder D, slotted to permit their removal in an endwise direction therefrom, and the removable retaining band or collar $d$.

9. In a machine of the type herein described, the cylinder having one portion of its body provided with longitudinal external grooves and its end enlarged and provided with internal grooves, in combination with the slides G, mounted in the external grooves, and the hammers E, mounted in the internal grooves in position to be actuated by the slides.

10. The shaft B, the gear O, fixed thereon, and the type-wheel mounted rigidly on said shaft, in combination with the axially-movable shaft N, the cam-wheel M, fixed thereon, the driving-gear P, fixed against side-play, and a sliding connection between said gear and its shaft.

11. In a machine of the type herein described, the combination, with printing or indenting devices, of a gage or indicator, Y, whereby the operator is enabled to determine the times for leaving blank spaces in the strip to facilitate its division.

12. In combination with the type-wheel arranged to deliver the strip at the left of the operator, the adjustable gage Y, substantially as described.

13. A wheel for an indenting or printing machine, provided with a series of independently-adjustable surfaces corresponding to the respective type, substantially as described and shown.

In testimony whereof I hereunto set my hand, this 18th day of January, 1886, in the presence of two attesting witnesses.

JOHN H. WHITE.

Witnesses:
FRANK GALT,
WM. TYLER PAGE.